United States Patent
Tu (10) Patent No.: US 7,639,488 B2
(45) Date of Patent: Dec. 29, 2009

(54) DISC DRIVE HOLDER FOR HOLDING A DISC DRIVE AND RELATED ELECTRONIC DEVICE

(75) Inventor: Chih-Kai Tu, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 6 days.

(21) Appl. No.: 12/121,763

(22) Filed: May 15, 2008

(65) Prior Publication Data

US 2009/0016014 A1    Jan. 15, 2009

(30) Foreign Application Priority Data

Jul. 9, 2007    (TW)    ............................... 96124951 A (51) Int. Cl.
    *G06F 1/16* (2006.01)
(52) U.S. Cl. ............... 361/679.33; 248/618; 364/708.1; 439/638

(58) Field of Classification Search ................. 248/618, 248/633; 364/708.1; 439/638; 361/679.36, 361/679.26, 679.27, 679.3
See application file for complete search history.

(56) References Cited

U.S. PATENT DOCUMENTS

| 5,784,251 | A   | * | 7/1998  | Miller et al. | ............. 361/679.6 |
| 6,404,625 | B1  |   | 6/2002  | Chen et al. |   |
| 7,126,817 | B2  |   | 10/2006 | Li |   |
| 2007/0211422 | A1 | * | 9/2007 | Liu et al. | .................... 361/685 |
| 2009/0073649 | A1 | * | 3/2009 | Ikeda et al. | ............ 361/679.35 |

* cited by examiner

*Primary Examiner*—Hung V Duong
(74) *Attorney, Agent, or Firm*—Winston Hsu (57) ABSTRACT

A disc drive holder includes a frame connected to a first side of a casing in a rotatable manner. A containing space is formed inside the frame for containing a disc drive. The disc drive holder further includes a supporting component pivoted to the frame. The supporting component includes a flexible section pivoted to the frame in a flexible manner, and a base section for supporting the frame on a second side of the casing when the flexible section is rotated out of the frame.

18 Claims, 7 Drawing Sheets

DISC DRIVE HOLDER FOR HOLDING A DISC DRIVE AND RELATED ELECTRONIC DEVICE

BACKGROUND OF THE INVENTION

1. Field of the Invention

The present invention relates to a disc drive holder for holding a disc drive and related electronic device, and more particularly, to a disc drive holder capable of changing location of a disc drive so that the user can disassemble or install other components and collect internal cables easily and related electronic device.

2. Description of the Prior Art

Mechanical design of electronic products trends high density and integration. More electronic modules are disposed inside narrow mechanical space of electronic products with easy disassembly and operation. For example, a computer has to be disassembled for replacing broken components, installing new components, upgrading the components, and so on. The computer with easy disassembly characteristic suits demand of the user. However internal electronic modules of the computer in the market are often interfered with one another so that a certain component is installed after other components are disassembled and cables connected to the components are disorderly. Taiwan patent Publication no. 407847 discloses a rotary holder for accommodating an electronic module. The rotary holder can swing relatively to a casing in different positions so as to disassemble or install the electronic module easily. However when the rotary holder swings perpendicularly to a bottom of the casing, the rotary holder can not support the electronic module above the bottom stably. It causes unexpected swing and incapable assembly. For example, the rotary holder might fall down and hurt the user's hand during the assembling process. There is a need to design a disc drive holder with easy assembly and safety.

SUMMARY OF THE INVENTION

It is therefore a primary objective of the claimed invention to provide a disc drive holder for holding a disc drive and related electronic device for solving the above-mentioned problem.

According to the claimed invention, a disc drive holder includes a frame connected to a first side of a casing in a rotatable manner. A containing space is formed inside the frame for containing a disc drive. The disc drive holder further includes a supporting component pivoted to the frame. The supporting component includes a flexible section pivoted to the frame in a flexible manner, and a base section for supporting the frame on a second side of the casing when the flexible section is rotated out of the frame.

According to the claimed invention, an electronic device includes a casing, and a holder including a frame connected to a first side of the casing in a rotatable manner. A containing space is formed inside the frame for containing a component. The holder further includes a supporting component including a flexible section pivoted to the frame in a flexible manner, and a base section for supporting the frame on a second side of the casing when the flexible section is rotated out of the frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
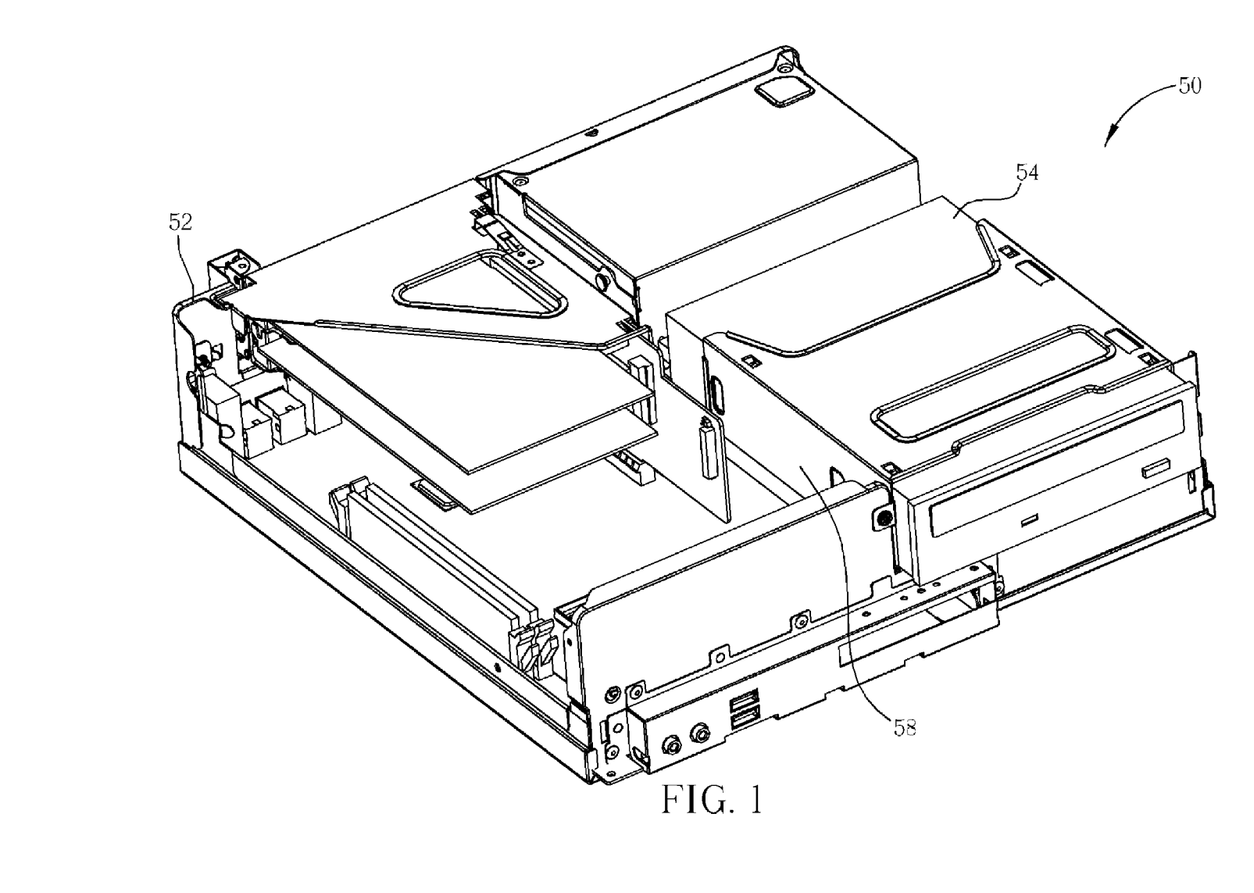
FIG. 1 to FIG. 3 are diagrams of internal components of an electronic device in different statuses according to a preferred embodiment of the present invention.
Figure 2:
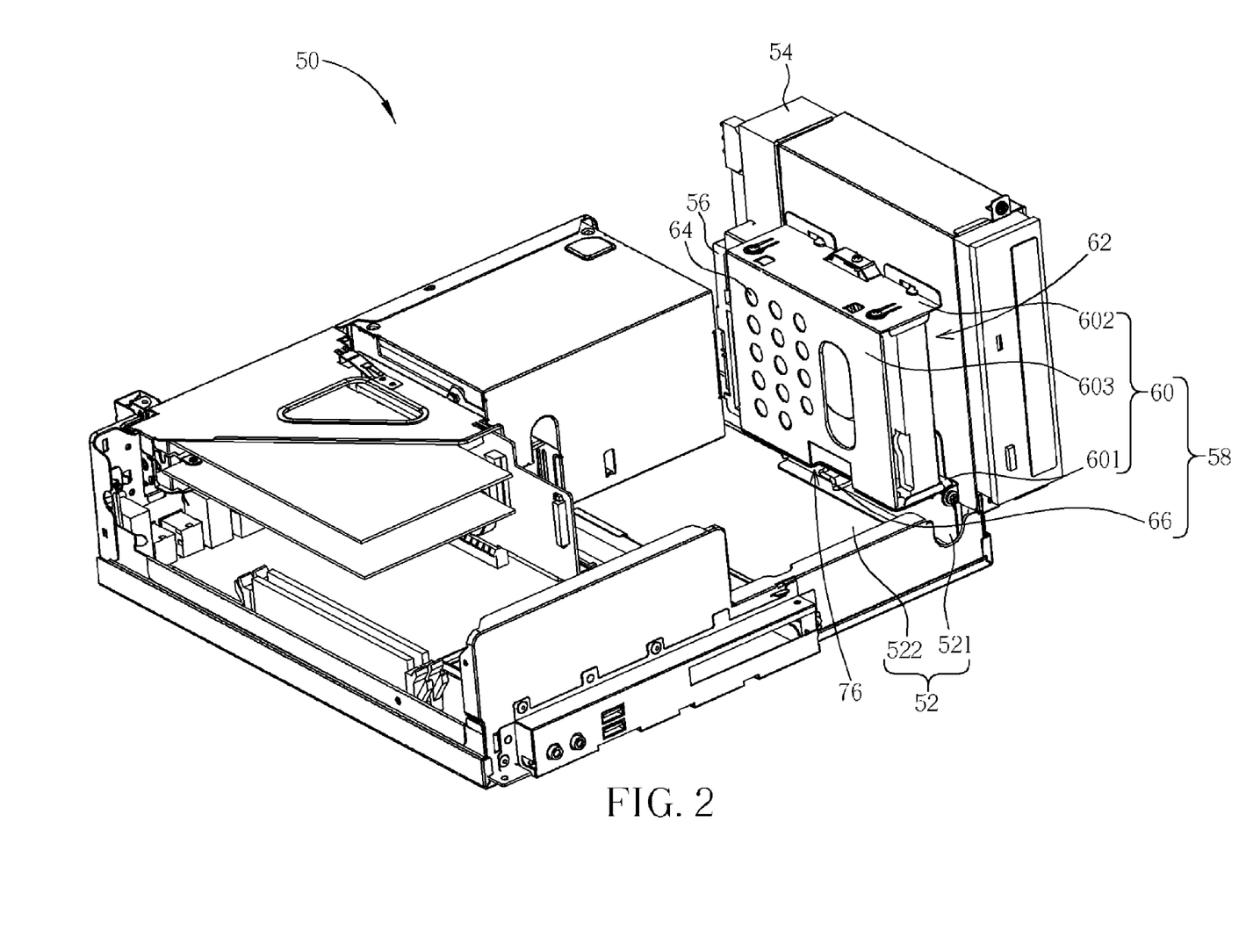
Figure 3:
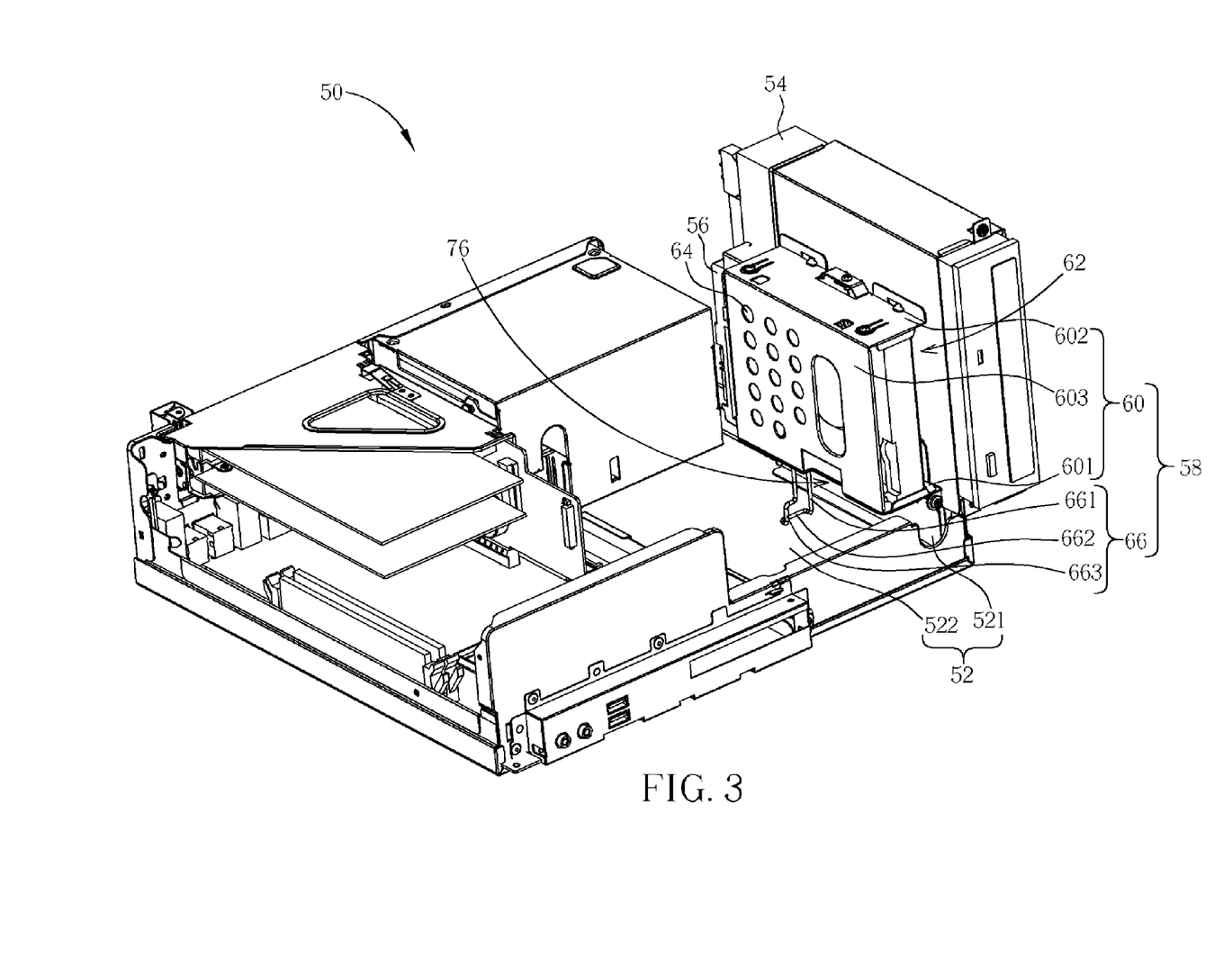

Please refer to FIG. 1 to FIG. 3. FIG. 1 to FIG. 3 are diagrams of internal components of an electronic device 50 in different statuses according to a preferred embodiment of the present invention. The electronic device 50 can be a desktop computer. The electronic device 50 includes a casing 52. The casing 52 includes a first side 521 and a second side 522. The electronic device 50 further includes a first disc drive 54 and a second disc drive 56. The first disc drive 54 can be an optical disc drive, and the second disc drive 56 can be a hard disc drive. The first disc drive 54 and the second disc drive 56 can be disc drives of other types. The first disc drive 54 and the second disc drive 56 are installed inside the casing. The electronic device 50 further includes a disc drive holder 58 for supporting and accommodating the first disc drive 54 and the second disc drive 56. The disc drive holder 58 includes a frame 60 connected to a first side 521 of the casing 52 in a rotatable manner. For example, the frame 60 can be connected to a shaft, and the shaft is pivoted to the first side 521 of the casing 52. The frame 60 includes a first lateral wall 601 pivoted to the first side 521 of the casing 52, a second wall 602, and a bottom surface 603 connected to the first lateral wall 601 and the second lateral wall 602. A containing space 62 is formed between the first lateral wall 601, the second lateral wall 602, and the bottom surface 603 for containing the first disc drive 54 and the second disc drive 56.

The shape and the size of the containing space 62 depend on shapes and number of disc drives. A plurality of dissipating holes 64 is formed on the bottom surface 603 of the frame 60 for dissipating heat generated by the first disc drive 54 and the second disc drive 56. The electronic device 50 further includes a supporting component 66 connected to the first lateral wall 601 of the frame 60 in a rotatable manner. The supporting component 66 can be bendable. The supporting component 66 is an elbow pipe according to this embodiment of the present invention.

When the disc drive holder 58 rotates to a position relatively to the casing 52 shown in FIG. 1, the first disc drive 54, the second disc drive 56, and a second side 522 of the casing 52 are parallel substantially so that the first disc drive 54 and the second disc drive 56 are accommodated inside the casing 52 completely. It's the status of a normal use of the electronic device 50.

When the disc drive holder 58 rotates to a position relatively to the casing 52 shown in FIG. 2 and FIG. 3, the first disc drive 54, the second disc drive 56 are perpendicular to the second side 522 of the casing 52 substantially so that the first disc drive 54 and the second disc drive 56 are capable of standing on the casing 52. Other components inside the casing 52 can be disassembled or installed easily, cables inside the casing 52 can be collected in order, and the first disc drive 54 and the second disc drive 56 can be disassembled or installed easily.

When the disc drive holder 58 rotates to a position above the casing 52, the supporting component 66 can be rotated to a position perpendicular to the frame 60 from a position close to the frame 60. The supporting component 66 can support the frame 60 on the second side 522 of the casing 52 stably, and it can prevent that the frame 60 falls down and hurts the user's hand during the assembling process.

Figure 4:
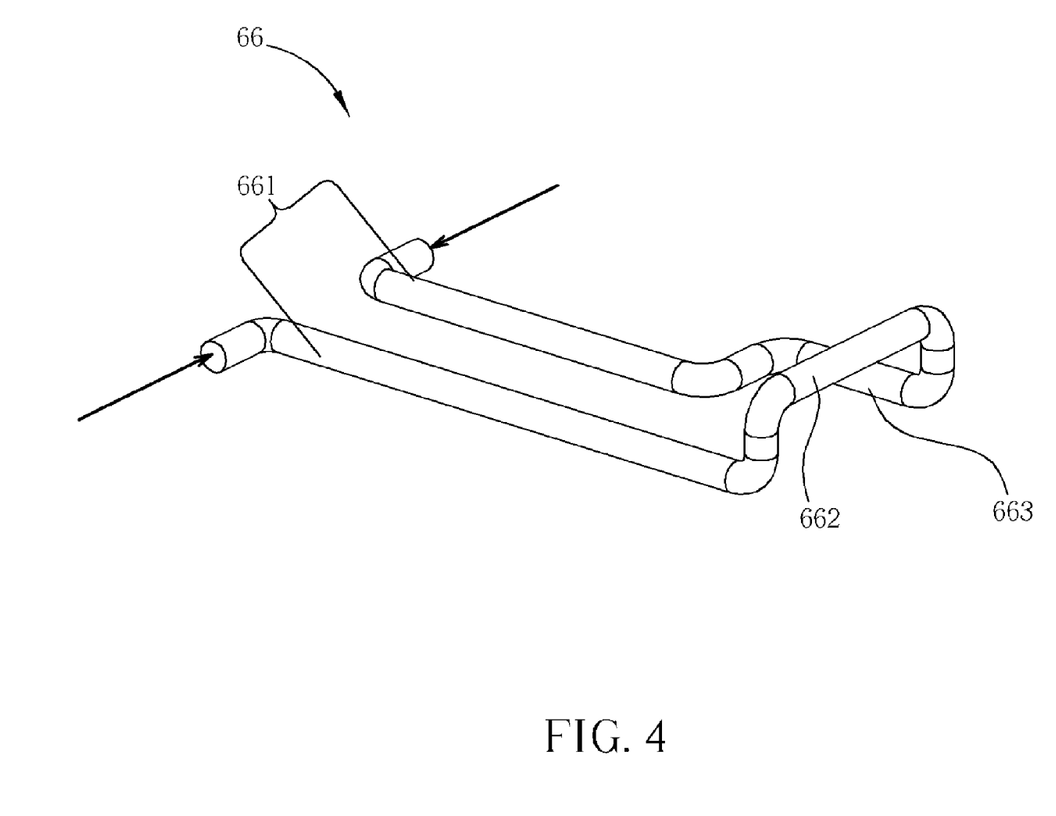
FIG. 4 is a schematic drawing of a supporting component according to the preferred embodiment of the present invention.

Please refer to FIG. 4. FIG. 4 is a schematic drawing of the supporting component 66 according to the preferred embodiment of the present invention. The supporting component 66 includes a flexible section 661, a base section 662, and a protruding section 663. The flexible section 661 has two free ends. The user can apply force to the free ends of the flexible section 661 laterally so as to deform the flexible section 661 in an arrow direction shown in FIG. 4. The base section 662 is a rigid section capable of supporting the frame 60 on the second side 522 of the casing 52. The protruding section 663 is connected with the flexible section 661 and the base section 662 and protrudes out of the flexible section 661. The cross-section of the supporting component 66 can be circular and compressible. The supporting component 66 can be made of metal material, such as stainless steel and wolfram steel, and shaped by a pipe-bending machine. The supporting component 66 can be made of plastic material and formed by injection molding process.

Figure 5:
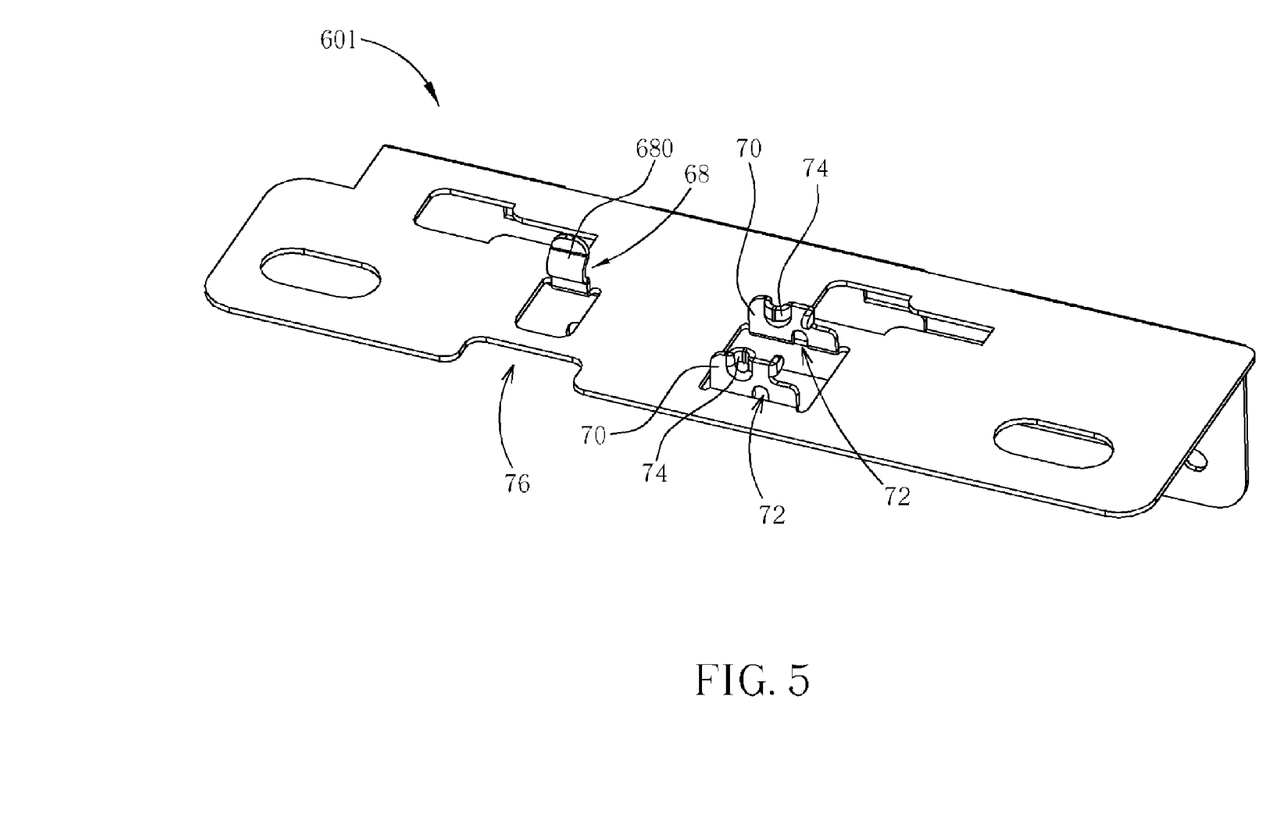
FIG. 5 is a schematic drawing of a first lateral wall according to the preferred embodiment of the present invention.
Figure 6:
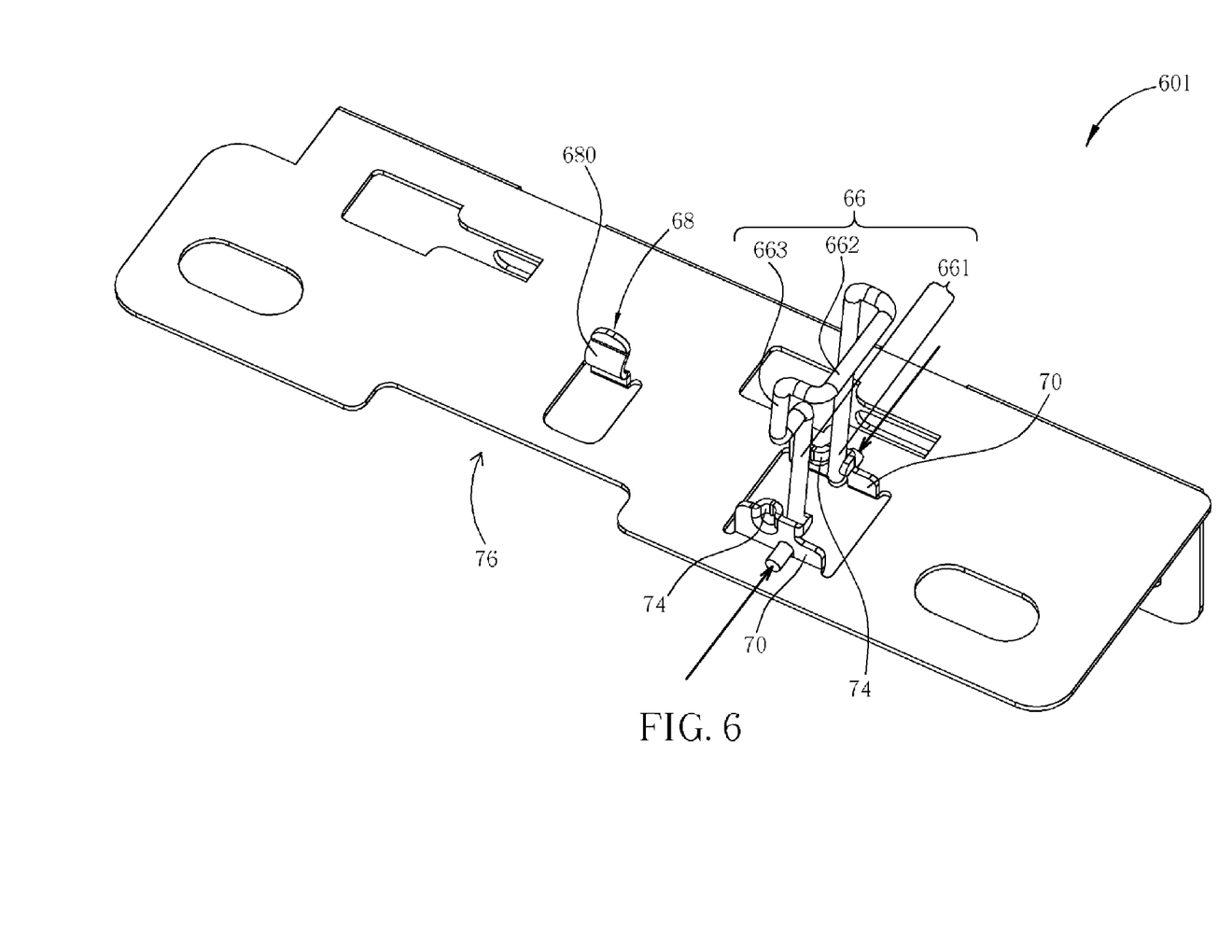
FIG. 6 is a diagram of the supporting component perpendicular to the first lateral wall substantially according to the preferred embodiment of the present invention.
Figure 7:
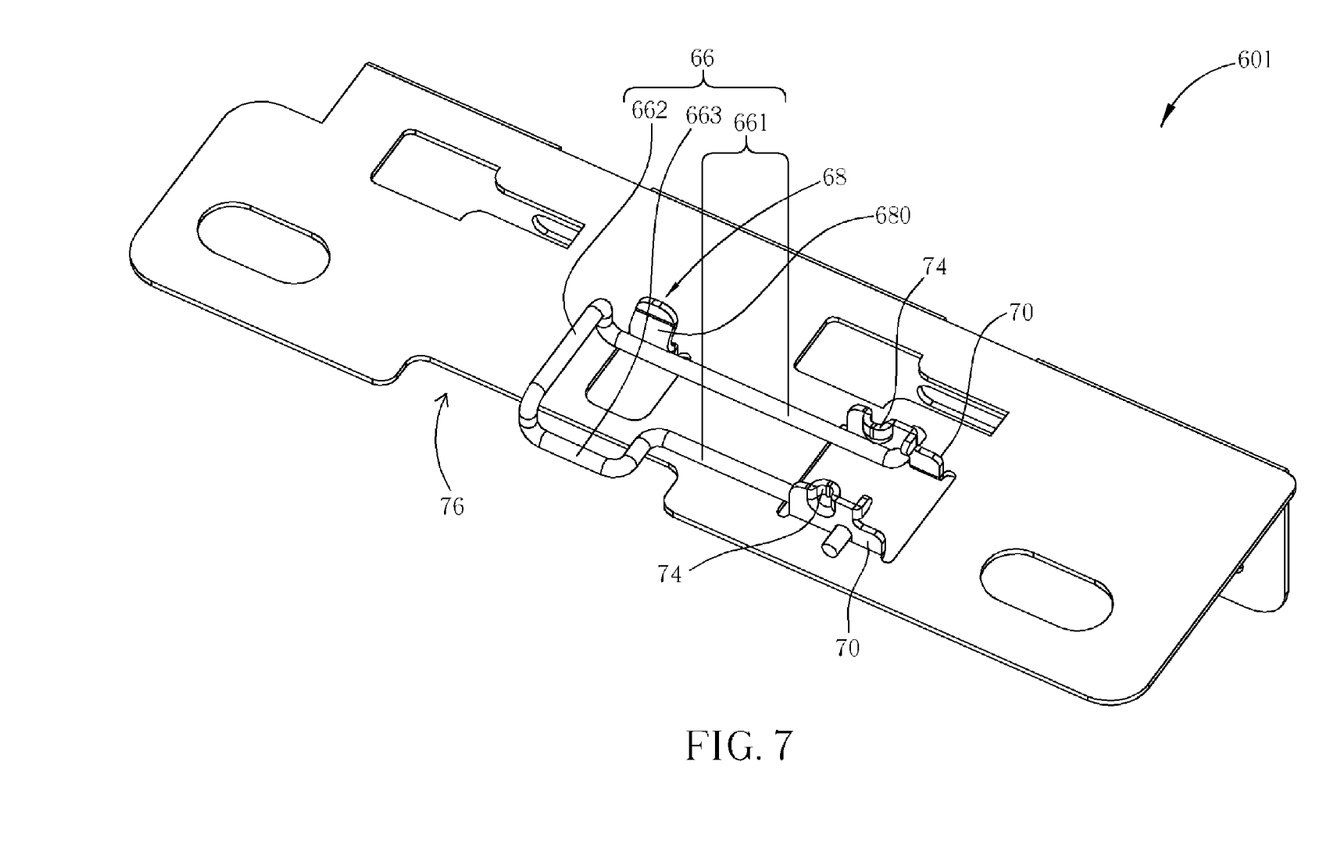
FIG. 7 is a diagram of the supporting component parallel to the first lateral wall substantially according to the preferred embodiment of the present invention.

Please refer to FIG. 5 to FIG. 7. FIG. 5 is a schematic drawing of the first lateral wall 601 according to the preferred embodiment of the present invention. FIG. 6 is a diagram of the supporting component 66 perpendicular to the first lateral wall 601 substantially according to the preferred embodiment of the present invention. FIG. 7 is a diagram of the supporting component 66 parallel to the first lateral wall 601 substantially according to the preferred embodiment of the present invention. A wedging component 68 is formed on the first lateral wall 601. The wedging component 68 includes a protruding part 680 for wedging the flexible section 661 of the supporting component 66 when the supporting component 66 rotates into the frame 60.

Two protrusions 70 are formed on the first lateral wall 601, and two holes 72 are formed on the protrusions 70 respectively for wedging two ends of the flexible section 661 of the supporting component 66. Each protrusion 70 includes a fixing component 74 for fixing the flexible section 661 of the supporting component 66 in a position perpendicularly to the first lateral wall 601 substantially. An indentation 76 is formed on the first lateral wall 601. When the supporting component 66 rotates into the first lateral wall 601, the protruding section 663 of the supporting component 66 is disposed in a position corresponding to the indentation 76 on the first lateral wall 601. As shown in FIG. 6, the flexible section 661 of the supporting component 66 can be pressed in an arrow direction to be installed inside the holes 72 on the protrusions 70.

The flexible section 661 of the supporting component 66 is pivoted inside the holes 72 on the protrusions 70, and the supporting component 66 is capable of rotating relatively to the first lateral wall 601. The user can push the base section 662 of the supporting component 66 for driving the supporting component 66 to rotate to the position parallel to the first lateral wall 601 substantially. The wedging component 68 connected to the first lateral wall 601 is an elastic structure, so the supporting component 66 deforms the wedging component 68 slightly until the supporting component 66 does not interfere with the wedging component 68. When the supporting component 66 does not interfere with the wedging component 68, the wedging component 68 restores to an undeformed position and wedges the flexible section 661 of the supporting component 66 so as to fix the supporting component 66 in the position parallel to the first lateral wall 601 substantially shown in FIG. 7.

On the contrary, the user can pull the base section 662 of the supporting component 66 for driving the supporting component 66 to rotate to the position perpendicular to the first lateral wall 601 substantially. Then the flexible section 661 of the supporting component 66 is pressed in the arrow direction by the fixing components 74 of the protrusions 70. After the supporting component 66 passes through the fixing components 74, the flexible section 661 of the supporting component 66 restores to the undeformed position and slides to slots of the protrusions 70 automatically so that the fixing components 74 fix the supporting component 66 in the position perpendicular to the first lateral wall 601 substantially shown in FIG. 6.

In addition, please refer to FIG. 2, FIG. 3, and FIG. 7, when the supporting component 66 rotates nearby the first lateral wall 601 and in the position parallel to the first lateral wall 601 substantially, the protruding section 663 of the supporting component 66 is disposed in the position corresponding to the indentation 76 on the first lateral wall 601. The protruding section 663 of the supporting component 66 exposes outside the first lateral wall 601 so that the user can move the protruding section 663 of the supporting component 66 easily for driving the supporting component 66 to rotate relatively to the first lateral wall 601.

In contrast to the prior art, the disc drive holder of the present invention can change location of disc drives easily and safely. It is convenient for the user to disassemble or install other components and collect internal cables easily. When the frame for accommodating the disc drive is perpendicular to the casing, the supporting component of simple structure can support the frame on the casing stably. It can prevent that the frame falls down suddenly and hurts the user's hand during the assembling process. The present invention provides the disc drive holder with simple structure, easy assembly, and safety.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A disc drive holder comprising:
   a frame connected to a first side of a casing in a rotatable manner, the frame comprising:
      a first lateral wall pivoted to the first side of the casing;
      a second wall; and
      a bottom surface connected to the first lateral wall and the second lateral wall; and
   a supporting component pivoted to the frame, the supporting component comprising:
      a flexible section pivoted to the frame in a flexible manner; and
      a base section for supporting the frame on a second side of the casing when the flexible section is rotated out of the frame;
   wherein a containing space is formed between the first lateral wall, the second lateral wall, and the bottom surface for containing a disc drive.

2. The disc drive holder of claim 1 wherein the supporting component is bendable on a lateral side of the frame.

3. The disc drive holder of claim 1 wherein a wedging component is formed on the first lateral wall for wedging the supporting component when the supporting component rotates into the frame.

4. The disc drive holder of claim 1 wherein at least one protrusion is formed on the first lateral wall and a hole is formed on the protrusion for wedging an end of the supporting component.

5. The disc drive holder of claim 4 wherein the protrusion comprises a fixing component for fixing the supporting component in a position perpendicularly to the first lateral wall substantially.

6. The disc drive holder of claim 1 wherein an indentation is formed on the first lateral wall and the supporting component further includes a protruding section connected to the flexible section and the base section for disposing in a position corresponding to the indentation on the first lateral wall.

7. The disc drive holder of claim 1 wherein a plurality of dissipating holes is formed on the bottom surface of the frame for dissipating heat generated by the disc drive.

8. The disc drive holder of claim 1 wherein the supporting component is made of metal material.

9. The disc drive holder of claim 1 wherein the supporting component is made of plastic material.

10. An electronic device comprising:
a casing; and
a holder comprising:
a frame connected to a first side of the casing in a rotatable manner, the frame comprising:
a first lateral wall pivoted to the first side of the casing;
a second wall; and
a bottom surface connected to the first lateral wall and the second lateral wall; and
a supporting component comprising:
a flexible section pivoted to the frame in a flexible manner; and
a base section for supporting the frame on a second side of the casing when the flexible section is rotated out of the frame;
wherein a containing space is formed between the first lateral wall, the second lateral wall, and the bottom surface for containing a disc drive.

11. The electronic device of claim 10 wherein a wedging component is formed on the first lateral wall for wedging the supporting component when the supporting component rotates into the frame.

12. The electronic device of claim 10 wherein at least one protrusion is formed on the first lateral wall and a hole is formed on the protrusion for wedging an end of the supporting component.

13. The electronic device of claim 12 wherein the protrusion comprises a fixing component for fixing the supporting component in a position perpendicularly to the first lateral wall substantially.

14. The electronic device of claim 10 wherein an indentation is formed on the first lateral wall and the supporting component further includes a protruding section connected to the flexible section and the base section for disposing in a position corresponding to the indentation on the first lateral wall.

15. The electronic device of claim 10 wherein a plurality of dissipating holes is formed on the bottom surface of the frame for dissipating heat generated by the component.

16. The electronic device of claim 10 wherein the supporting component is made of metal material.

17. The electronic device of claim 10 wherein the supporting component is made of plastic material.

18. The electronic device of claim 10 wherein the component is a hard disc drive or an optical disc drive.

* * * * *